United States Patent [19]

Pakdipanichpong

[11] Patent Number: 5,037,232
[45] Date of Patent: Aug. 6, 1991

[54] TABLE LEG LOCK

[76] Inventor: Prasit Pakdipanichpong, 180-182 Luang Road, Siyek Vorachak, Bangkok 10100, Thailand

[21] Appl. No.: 518,826

[22] Filed: May 4, 1990

[51] Int. Cl.$^5$ .............................................. F16B 9/00
[52] U.S. Cl. .................................... 403/199; 403/168; 403/328; 108/150
[58] Field of Search .............. 403/167, 168, 328, 108, 403/199; 108/150; 248/408, 519, 523

[56] References Cited

U.S. PATENT DOCUMENTS

| | | | |
|---|---|---|---|
| 697,911 | 4/1902 | Adler | 108/150 X |
| 713,794 | 11/1902 | Ostermann | 403/108 X |
| 2,583,786 | 1/1952 | Marzucco | 403/108 X |
| 3,217,672 | 11/1965 | Haughey | 108/150 X |
| 3,377,966 | 4/1968 | Bates et al. | 403/328 X |

Primary Examiner—Andrew V. Kandrat
Attorney, Agent, or Firm—James D. Hall

[57] ABSTRACT

This invention comprises an improved mechanism for latching telescoping articles together and for releasing them from such a condition by the act of rotating them with respect to each other. The mechanism includes a pair of pawls interconnected to each other by a spring in such a manner that the latch heads of the pawls are urged in a plane in opposite directions by action of the spring. The invention is illustrated and described in the context of a table which is mounted to the floor of a vehicle, vessel or the like.

7 Claims, 5 Drawing Sheets

TABLE LEG LOCK

FIELD OF THE INVENTION

This invention relates to a means to secure a single leg table, more generally referred to as a pedestal table, to a base and more particularly to a means to secure a pedestal table to the flooring of a van, mobile home, recreational vehicle, or the like.

BACKGROUND OF THE INVENTION

Vans, mobile homes and recreational vehicles, generally referred to as RVs, have long been fitted with tables. Such tables serve the same purpose and use as do tables in conventional homes, but are designed so to fit into the confined, constricted or limited space within such vehicles. Normally such tables include center pedestals which are wedged into floor mounted socketed bases.

In the event of an accident, these tables can become airborne and are extremely dangerous to the occupants of the vehicle. Indeed, there have been numerous and sometimes fatal injuries inflicted by such tables. It has accordingly been desirable to design and structure the tables so that they may be removed and stored in a secure and safe portion of the vehicle (or to be removed completely and left at home). Furthermore, means should be developed whereby such tables may be secured to the vehicle to prevent them from becoming airborne in an accident.

The present invention is directed to a simplified, inexpensive, yet safe, means for securing a table to, and releasing it from, a base portion which is fitted in the floor of the vehicle.

It will be understood that, although the principal utility of this invention is in the illustrated environment, it should not be so limited. It will find essentially the identical utility on vessels and fishing craft, and even in aircraft, as will be obvious from the description. An example of the former would be the seat on the increasingly popular "bass boat." Also, it will find utility on porches or decks and on piers or docks.

SUMMARY OF THE INVENTION

The present invention provides a self contained latching system, located within the pedestal leg, which may be actuated by a mere twist of the pedestal leg. There are preferably two virtually identical latching mechanisms, each comprised of a spring pawl. One latching mechanism secures the pedestal leg to the floor and the second latching mechanism secures an object such as a table top to the pedestal leg. The table is of conventional design and structure and the base, which accepts the pedestal leg, is also of relatively conventional design and structure.

The present invention relates to the means for securing and latching the pedestal leg to the base and to an object. To actuate the latch, the pedestal leg is rotated in one direction; to deactivate the latch, the pedestal leg is rotated in the opposite direction.

DETAILED DESCRIPTION OF THE PREFERRED EMBODIMENT

Figure 1:
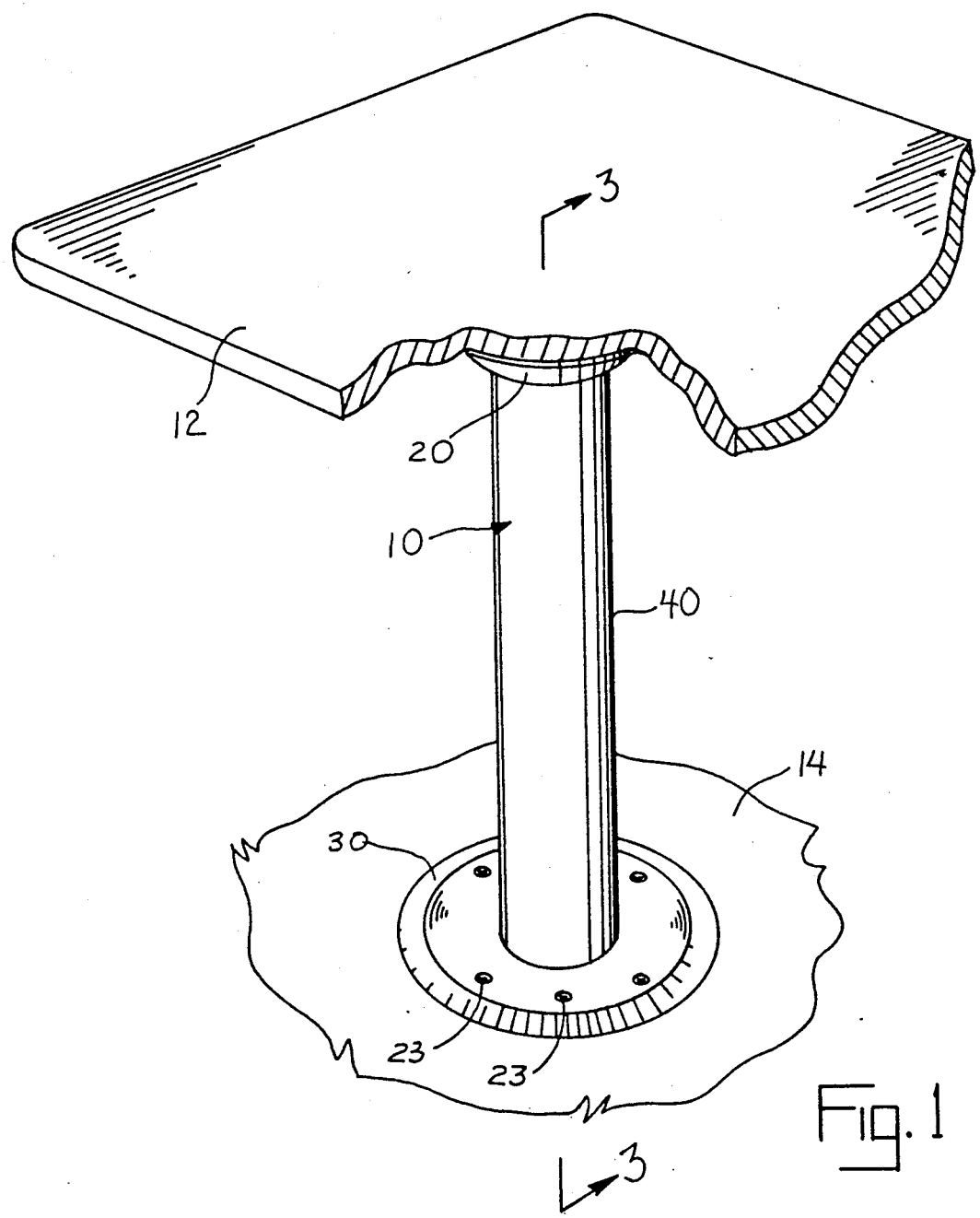
FIG. 1 is a perspective partial sectional view of the pedestal table of this invention, in its assembled condition.

A table supported by a single leg, as opposed to three or four, is generally referred to in the trade as a pedestal table. In the classical sense, a pedestal is the support or foot of a column, or the part on which an upright work, e.g., a statue, stands. In an engineering sense, a pedestal is a support which carries, e.g., a bridge truss or girder, and transmits the load it receives to the top of a pier or abutment.

It is in this latter sense that I herein refer to the structure as a pedestal. For purposes of explanation, however, I shall borrow from both the classical and the mechanical and refer herein to the lower support as the base, to the column as the leg and to that fixture which supports the table as the surbase.

Referring now to the figures, the invention is illustrated as a latching means within a pedestal depicted as a support 10 for table 12. Support 10 includes a surbase 20 fixed to table 12, a base 30 fixed to floor 14, and a leg 40, extending therebetween and functioning to support table 12 a desired distance above floor 14.

Other than as modified to receive the present invention, base 30 and surbase 20 are relatively standard supporting fixtures and will be described herein only to that extent necessary to accommodate and accept the latching means.

Surbase 20 is structured so to fit flush against table 12 and to extend downwardly a sufficient distance, and to be socketed to accept leg 40. Fastener holes 22 are provided for accommodating screws 23 used to secure surbase 20 to table 12. Base 30 is structured so to fit relatively flush with the surface of floor 14 and to extend therethrough. Base 30 socketed so to accept leg 40 and is of sufficient strength and stability to support leg 40 and attached table 12. Fastener holes 32 are provided in base 30 in order to accommodate screws 23 used to secure the base to the floor 14.

It will be appreciated that base 30 and surbase 20 are meant to be secured with relative permanence to floor 14 and table 12 respectively, and that, for purposes of storage and convenience, leg 40 is meant to be detachable from both. Leg 40 is of sufficient strength and rigidity to support table 12.

Leg 40 is generally symmetrical in shape and preferably tapered at both ends. The reason for this is to avoid a situation where there is a "top" or "bottom", one of which must be fitted to base 30 and the other to surbase 20. Configured symmetrically, either end may be inserted into either base 30 or surbase 20.

Since both ends of leg 40 are of the same construction, only one end of leg 40 need be described in detail. It should be obvious, however, that if there is a reason for the ends to be configured differently one from the other, such minor modification can be effected without departing from the invention.

There is an additional reason for this symmetry, and that has to do with base 30. As previously noted, the pedestal table is illustrated in the environment of a van, mobile home or RV. In such an environment, space exists below the floor of the vehicle to accommodate a base which extends therethrough. Indeed, it is desirable in such an environment to have a flush-fitting base for safety, one over which a person is not likely to trip. In another environment, e.g., a vessel or water craft, not having a deck per se, it may be imprudent to create an opening in the "floor." In such an environment, it may be desirable to secure to the floor a base having the shape and configuration of the surbase, i.e., flush-mounted. It is accordingly preferred that leg 40 be symmetrical and that these portions of base 30 and surbase 20 which receive the ends of leg 40 be configured so that the respective bases are interchangeable.

The latching mechanism, identified by the numeral 50, falls within a class of devices which may be generically referred to as spring pawls. In this instance, latching mechanism 50 includes a pair of spring pawls, motivated by a single helical spring which urges the pawls to move in opposite directions one from the other into a latching condition. More specifically, and referring to the figures, latching mechanism 50 consists of two symmetrical pawls 52 united in movement by helical spring 80 in such a fashion as to be urged away from one another in the same plane. Once again, because they are symmetrical, and in order to simplify the description, one pawl only will be described in detail.

Figure 2:
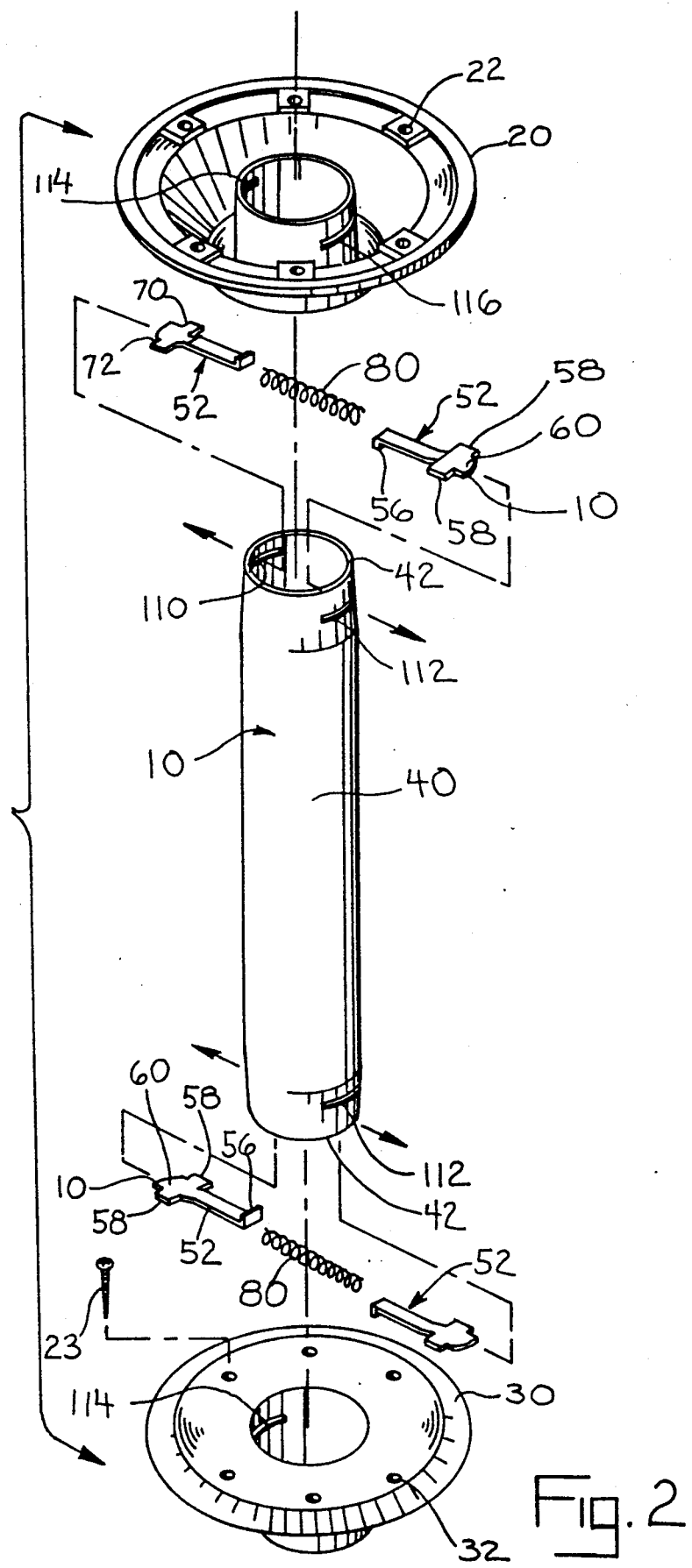
FIG. 2 is an exploded perspective view of the pedestal leg in relation to the means for securing the table to the pedestal leg and the combination to the floor.

Each pawl 52 is a unitary strip of metal having what will be herein identified solely for descriptive purposes as a foot 56, arms 58, and a head 60, best seen in FIG. 2. Foot 56 is bent at a general right angle.

Head 60 at its tip 100 is of an arcuate shape. The arms 58 are preferably of the same general length and are rounded at shoulder surfaces 70, 72 to conform to the inner diameter of wall 90 of leg 40. Head 60 from shoulder surface 70 extends outwardly along the axis of the head a distance approximating the thickness of wall 90 plus the thickness of wall 92 of the receiving portion of base 30. This ensures adequate insertion of the tip into the slots. Head 60 extends from arm surface 72 outwardly along the axis of the head a distance equal to the thickness of wall 90 of leg 40.

Tip 100 of head 60 maintains a curved shape generally conforming to the outer circumference of wall 92 for approximately one half its extent and then is chamfered to meet the outer circumference of wall 90. Wall 90 of leg 40 has two slots 110, 112 located opposite each other and of lengths conforming to the cross-sectional dimensions of tips 100 of heads 60 of pawls 52. Slots 110, 112 are equidistant from end 42 of leg 40. It must here be recalled that it was stated previously that the ends of leg 40 were symmetrical and that, when one end is described both are described. It will accordingly be understood that when we say two slots we mean that there are two slots at each end of leg 40, a latching mechanism 50 at each end.

Each pawl 52 along its longitudinal dimension is offset slightly immediately before head 60 and in a direction opposite foot 56. This offset is such that when pawls 52 are mated with each other and assembled with helical spring 80 to form latching mechanism 50, heads 60 are accordingly in the same plane.

Helical spring 80 is compressed between heads 60 of pawls 52 so that the heads 60 of latching mechanism 50 are urged away from each other. Spring 80 is of a diameter closely approximating the width of each pawl 52. Foot 58 of each pawl protrudes between turns of spring 80 to prevent separation of the pawls during assembly of the latching mechanism 50 into the leg 40. The combination of a pair of pawls 52, surrounded by helical spring 80, results in a completely self-contained, self-actuating latching mechanism 50. When the latching mechanisms are inserted into leg 40 and heads 60 are inserted into slots 110, 112, this action of spring 80 maintains the proper location of the latching mechanism heads.

Referring to surbase 20 and base 30, it will be recalled that, although the two are shaped quite differently, these components which receive the ends of leg 40 are essentially the same. For purposes of this description, base 30 will be described and that portion thereof which receives leg 40 will be referred to as cup 24 and that portion which receives screws 23 will be referred to as mounting flange 25.

Cup 24 is of a slightly truncated conical shape. End 42 of leg 40 is tapered to conform to the shape of cup 24. While this is not an absolute requirement, it has been found that such a taper facilitates the insertion of leg 40 into cup 24.

Slots 114, 116 are located opposite from each other in wall 26 of cup 24 and are shaped to receive the heads 60 of latching mechanism 50. Slots 114 and 116 are preferably located the same distance from bottom wall 28 of cup 24 as are slots 110, 112 located from end 42 of leg 40. All of the slots are virtually identical in shape. Tip 100 of head 60 is preferably beveled to allow it to be cammed more easily over flange 25 of base 30 during insertion of the leg.

With latching mechanism 50 held in place by action of the outwardly urging force of spring 80, shoulder surfaces 70 and 72 of the pawls press against the inner surface of leg wall 90. To assemble, leg 40 is inserted into cup 24 to cause heads 60 to be cammed over flange 25 and down wall 26 of cup 24. As end 42 of leg 40 reaches wall 28 of cup 24, slots 110, 114 and 112, 116 are at the same level. Leg 40 is then rotated until heads 60 are in alignment with slots 114, 116, at which time the pressure exerted outwardly by spring 80 causes the heads of latching mechanism 50 to snap into the slots in a latching position securing the leg to the base against axial separation.

Figure 3:
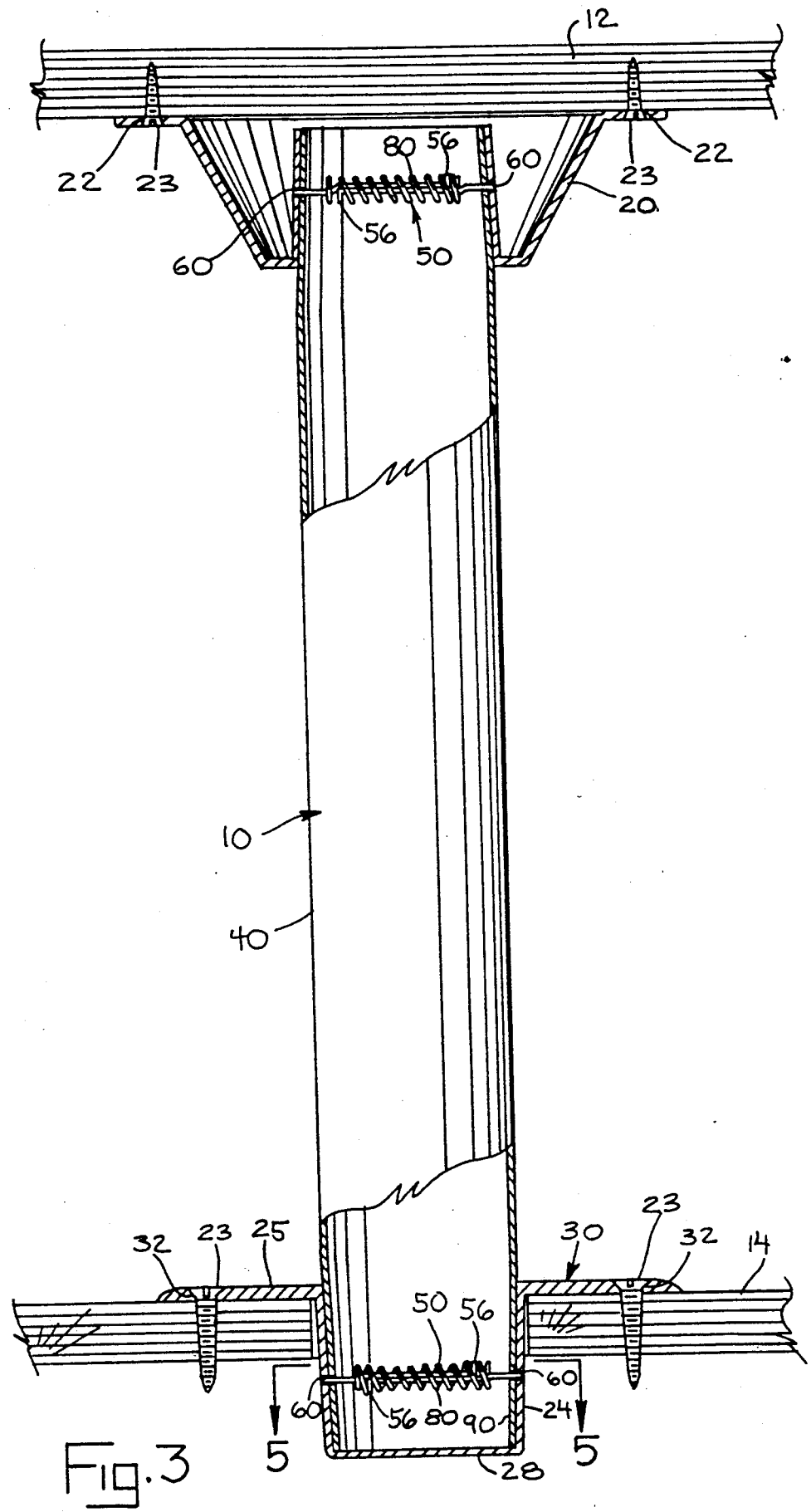
FIG. 3 is a longitudinal sectional view of the structure of FIG. 1, taken along line 3—3 thereof, showing the structure in a latched condition.
Figure 4:
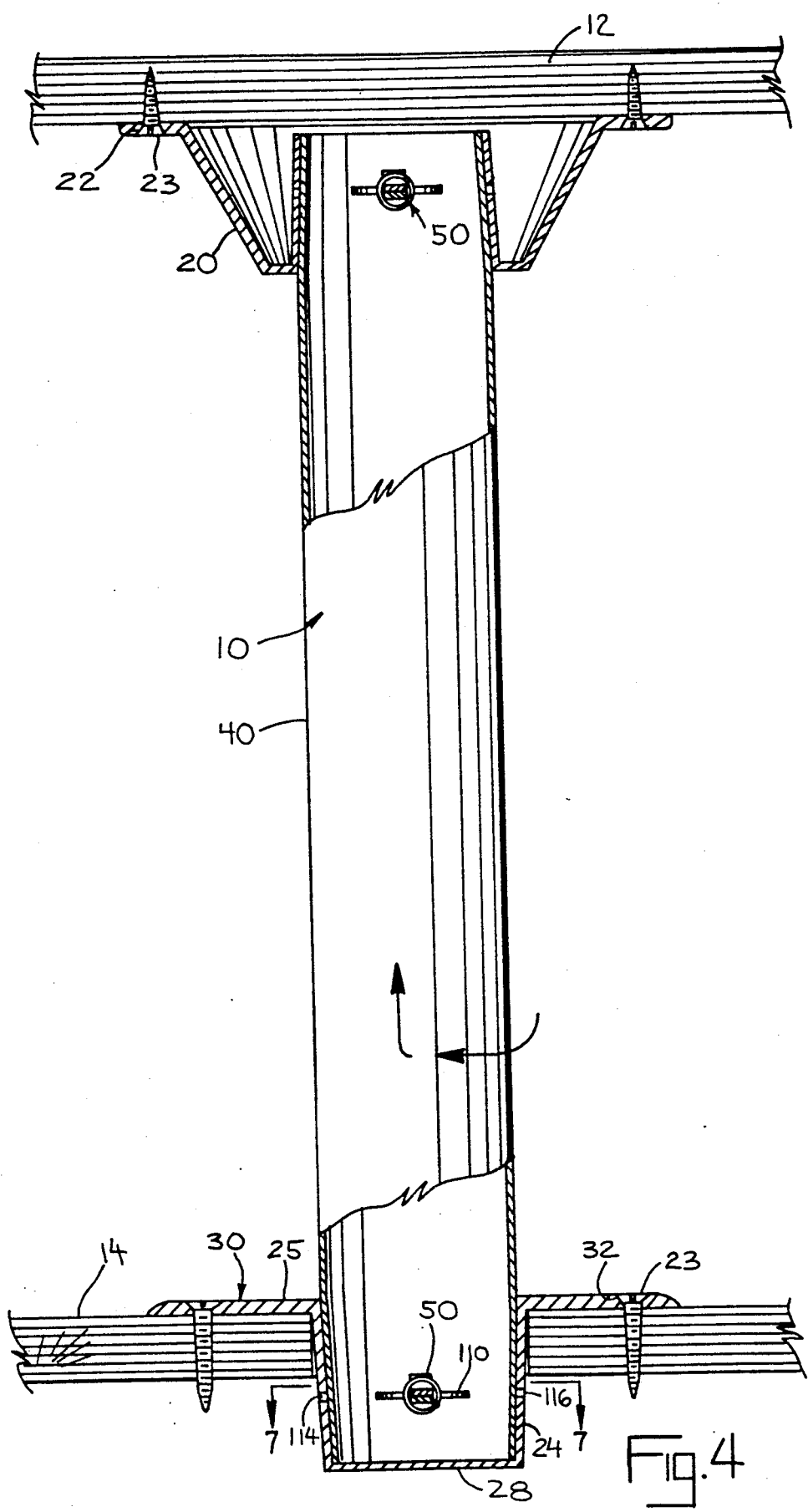
FIG. 4 is a longitudinal sectional view of the structure of FIG. 1, taken along line 3—3 thereof, showing the structure in an unlatched condition.
Figure 7:
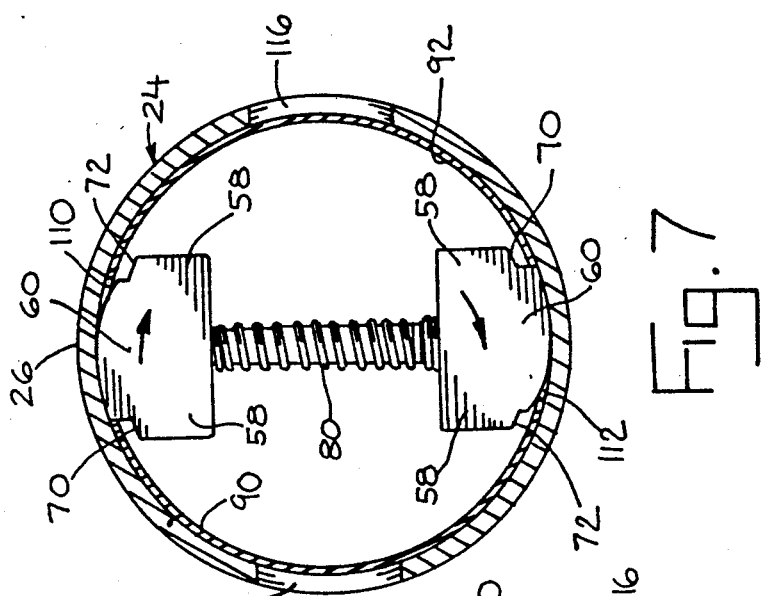
FIG. 7 is a cross-sectional view of the latching mechanism, taken along line 7—7 of FIG. 4, showing the spring pawl in an unlatched condition.
Figure 6:
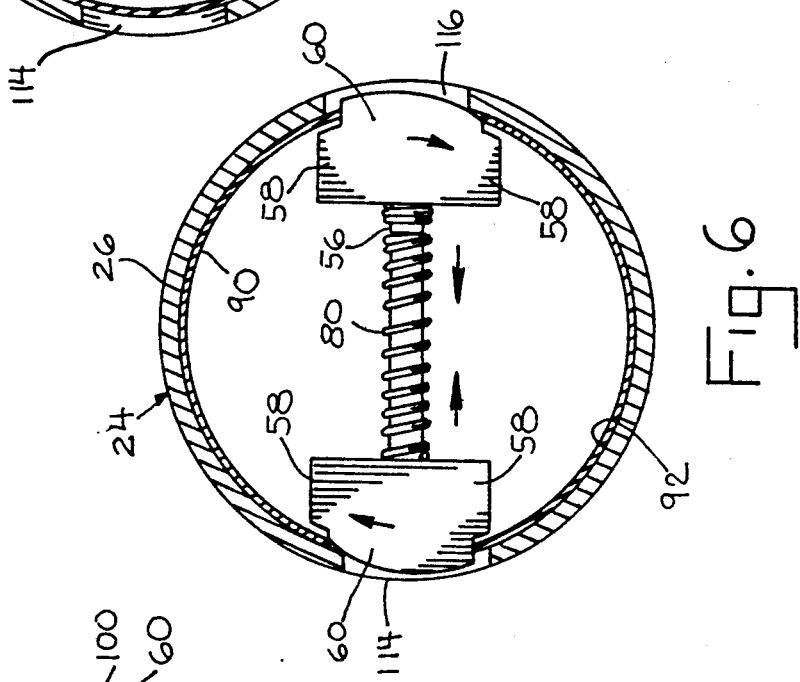
FIG. 6 is a cross-sectional view of the same latching mechanism, showing the spring pawl in its initial movement from a latching to an unlatching condition.
Figure 5:
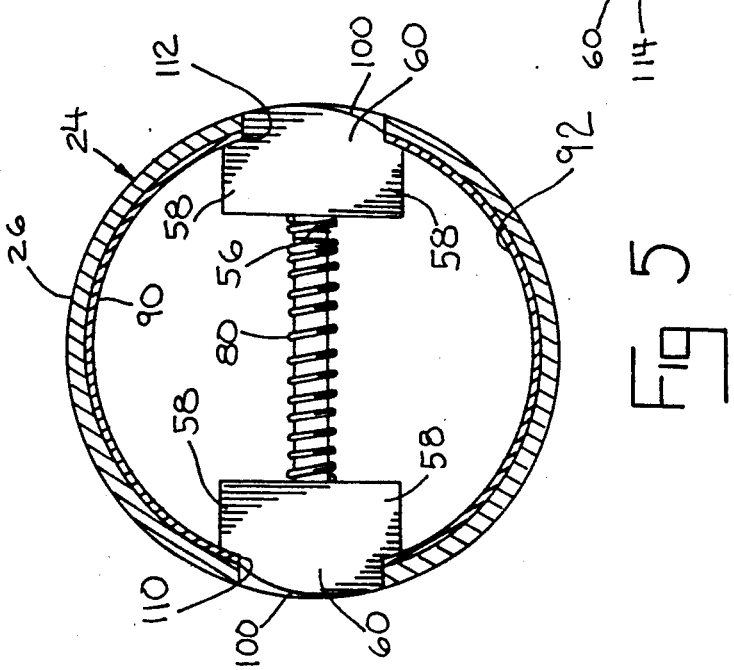
FIG. 5 is a cross-sectional view of the latching mechanism, taken along line 5—5 of FIG. 3, showing the spring pawl in a latching condition.

The shape of tip 100 of head 60 assists in the detachment of the leg from the base. FIGS. 3 and 5 depict latching mechanism 50 in its aligned and latched condition. As leg 40 is rotated in a clockwise direction, the chamfered tips 100 of heads 60 are cammed along the edge of slots 114, 116, urging pawls 52 inwardly and compressing spring 80, as shown in FIG. 6. Further clockwise movement of leg 40 causes heads 60 to be cammed completely free of slots 114, 116, as shown in FIGS. 4 and 7, and leg 40 may be lifted from base 30.

If clockwise turning of tubular leg 40 releases both the latching mechanism from base 30 and the latching mechanism from surbase 20, it will be apparent that one or both may release at the same time. Because the latching mechanism is self-contained, it is reversible. FIG. 2 displays the heads 60 of pawls 52 of lower latching mechanism 50 in a condition which permits clockwise rotation. Heads 60 of pawls 52 of upper latching mechanism 50 are illustrated in a condition which permits anti-clockwise rotation. Release of the leg from either the base or surbase can be clockwise or anti-clockwise, by choosing a selected inverted or non-inverted orientation of the latching mechanism 50 during its assembly into the leg.

In operation, and placed in any suitable environment, table 12 and leg 40 are in a storage compartment. Surbase 20 is secured to table 12 and base 30 is secured to the floor. When it is desired that the table be utilized, leg 40 is inserted into cup 24 of surbase 20 and latched. Table 12 is lifted into its upright position and centered over base 30. Leg 40 is inserted into cup 24 of base 30 and rotated until the slots are aligned and latching mechanisms 50 spring into position.

For removal, table 12 is rotated in the opposite direction, the co-action between tips 100 of heads 60 of pawls 52 and leg wall 90 effectively cam latching mechanism 50 inwardly against the pressure of spring 80 and out of engagement with slots 114, 116. Table 12 and leg 40 may then be removed, separated and placed in storage.

It will be understood that the invention is not to be limited to the precise form disclosed in the preferred embodiment but may be modified without departing from the scope of the invention as defined by the appended claims.

What is claimed is:

1. In combination, an assembly for releasably mounting an object to a floor, said mounting assembly including a leg having a tubular end and a base which is secured to the floor, said base being cup-shaped and adapted to receive said end of the leg, a pair of oppositely directed pawls, said leg end having opposed slots, each pawl having a head, said pawls fitted into said leg end, means for yieldably urging each pawl head into a said leg end slot in an outwardly projecting orientation, said base having opposed slots, each pawl head extending into a said base slot when said leg is fitted into said base, each pawl head including a camming surface means permitting rotation of said leg in one direction and preventing rotation of said leg in the opposite direction when the leg is fitted into said base and said head extends into a said base slot, said camming surface means for causing each pawl to be urged inwardly of said leg when the leg is rotated in said one direction relative to said base to free each head from its engaged base slot to permit removal of said leg from the base.

2. The assembly of claim 1 and a surbase secured to said object, said leg having an opposite tubular end, said surbase being cup-shaped and adapted to receive said opposite end of the leg, said opposite leg end having opposed slots and a second pair of oppositely directed pawls, each pawl having a head, said second pair of pawls fitted into said leg opposite end, and means for yieldably urging each head of said second pair of pawls into a said opposite leg end slot in an outwardly protruding orientation, said surbase having opposed slots, each head of said second pair of pawls extending into a said surbase slot when said leg opposite tubular end is fitted into said surbase.

3. In combination, an assembly for releasably mounting object to a floor, said mounting assembly including a leg having a tubular end and a base which is secured to the floor, said base being cup-shaped and adapted to receive said end of the leg, a pair of oppositely directed pawls, said leg end having opposed slots, each pawl having a head, said pawls fitted into said leg end, means for yieldably urging each pawl head into a said leg end slot in an outwardly projecting orientation, said base having opposite slots, each pawl head extending into a said base slot when said leg is fitted into said base, said pawls overlying each other with the respective heads thereof extending in opposite directions, said yieldably urging means constituting a spring extending compressably between said pawl heads, and a surbase secured to said object, said leg having an opposite tubular end, said surbase being cup-shaped and adapted to receive said opposite end of the leg, said opposite leg end having opposed slots and a second pair of oppositely directed pawls, each pawl having a head, said second pair of pawls fitted into said leg opposite end, means for yieldably urging each head of said second pair of pawls into a said opposite leg end slot in an outwardly protruding orientation, said surbase having opposed slots, each head of said second pair of pawls extending into a said surbase slot when said leg opposite tubular end is fitted into said surbase, each of said second pair of spring pawls including a camming surface at its said head to permit rotation of said leg in one direction and to prevent rotation of said leg in the opposite direction relative to said surbase, said last mentioned one and opposite directions being oppositely directed to said first mentioned one and opposite directions relating to said first mentioned pair of pawls.

4. In combination, an assembly for releasably mounting an object to a floor, said mounting assembly including a leg having a tubular end and a base which is secured to the floor, said base being cup-shaped and adapted to receive said end of the leg, a pair of oppositely directed pawls, said leg end having opposed slots, each pawl having a head, said pawls fitted into said leg end, means for yieldably urging each pawl head into a said leg end slot in an outwardly projecting orientation, said base having opposed slots, each pawl head extending into a said base slot when said leg is fitted into said base, each pawl head including camming surface means for causing each pawl to be urged inwardly of said leg only when the leg is rotated relative to the base to free each head from its engaged base slot to permit removal of the leg from the base.

5. In combination, an assembly for releasably mounting an object to a floor, said mounting assembly including a leg having a tubular end and a base which is secured to the floor, said base being cup-shaped and adapted to receive said end of the leg, a pawl, said leg end having a slot therein, said pawl having a head and fitted into said leg end, means for yieldably urging said pawl head into said leg end slot in an outwardly projecting orientation, said base having a slot, said pawl head extending into said base slot when said leg is fitted into the base, said pawl head including camming surface means for causing said pawl to be urged inwardly of said leg only when the leg is rotated relative to said base to free said pawl head from its engaged base slot to permit removal of the leg from the base.

6. The assembly of claim 5 wherein said camming surface means permits rotation of said leg one direction and prevents rotation of said leg in the opposite direction when the leg is fitted into said base and each pawl head extends into said base slot.

7. In combination, an assembly for releasably mounting an object to a floor, said mounting assembly including a leg having a tubular end and a base which is secured to the floor, said base being cup-shaped and adapted to receive said end of the leg, a pair of oppositely directed pawls, said leg end having opposed slots, each pawl having a head, said pawls fitted into said leg end, means for yieldably urging each pawl head into a said leg end slot in an outwardly projecting orientation, said base having opposed slots, each pawl head extending to a said base slot when said leg is fitted into said base, said pawls overlying each other with the respective heads thereof extending in opposite directions, a helical spring extending about the pawls and compressably between the pawl heads, said spring having multiple turns, each pawl including an out turned foot located opposite its head, said foot of each pawl extending between turns of said spring to prevent separation of said pawls from said spring, each pawl including transverse arm part constituting abutment means contacting said leg about said leg end slot when the head of said pawl projects into a said leg end slot.

* * * * *